O. L. BURDETT.
NAUTICAL INDICATING DEVICE.
APPLICATION FILED JAN. 19, 1912.
1,067,716.
Patented July 15, 1913.
2 SHEETS—SHEET 1.
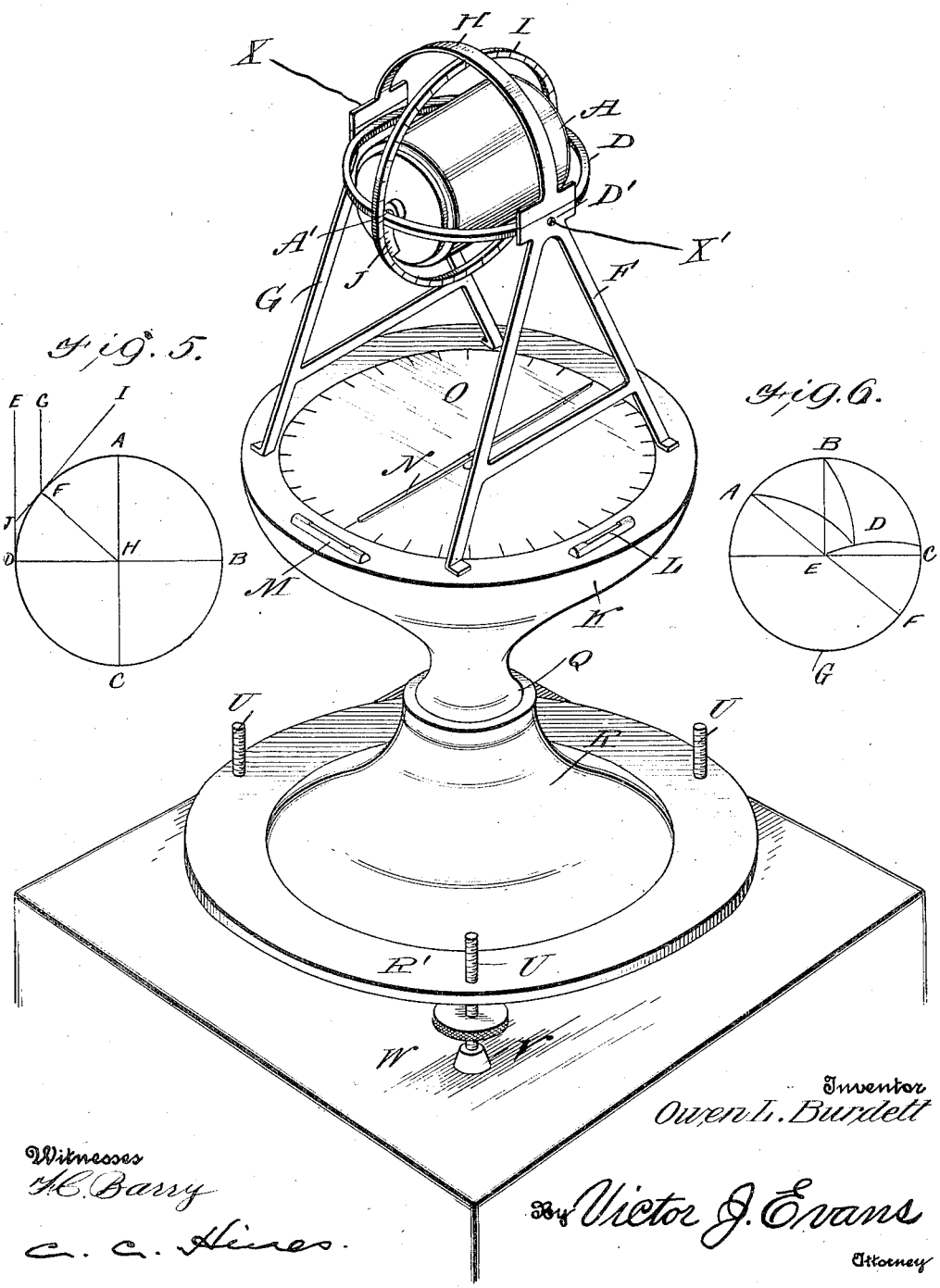

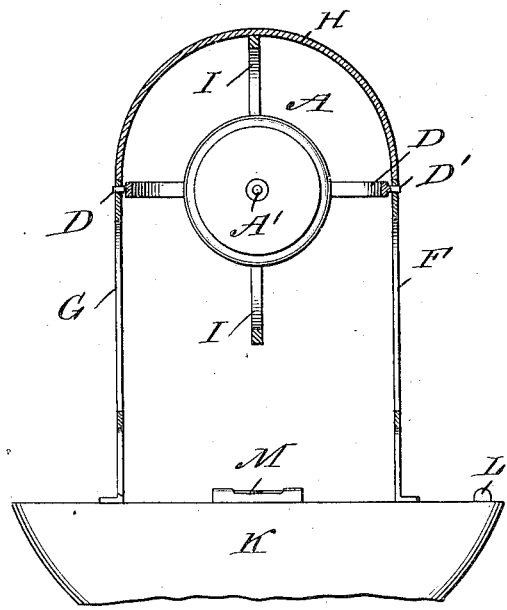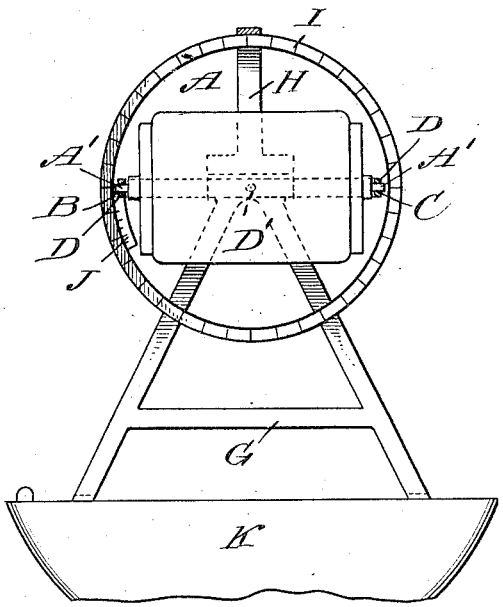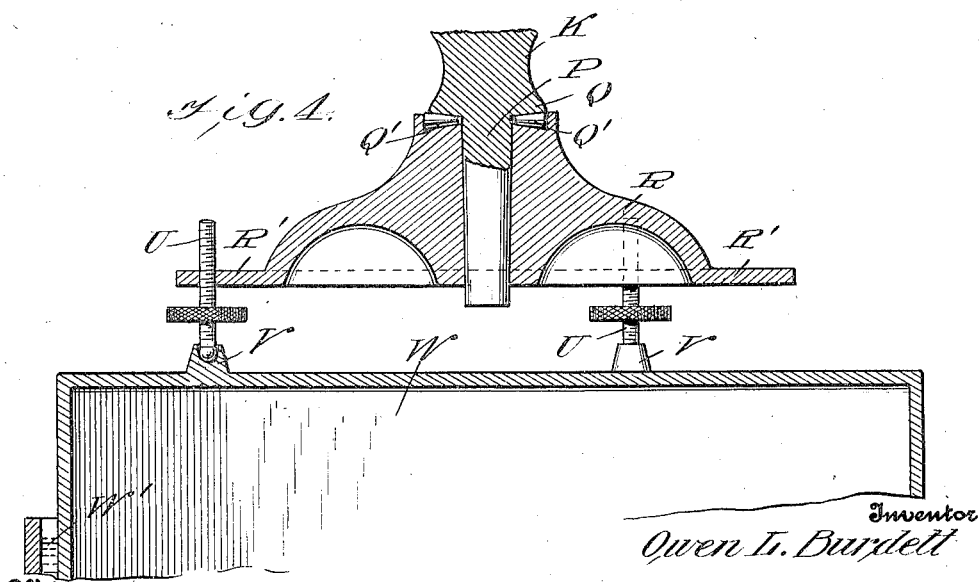

UNITED STATES PATENT OFFICE.

OWEN L. BURDETT, OF BUFFALO, NEW YORK.

NAUTICAL INDICATING DEVICE.

1,067,716.  Specification of Letters Patent.  Patented July 15, 1913.

Application filed January 19, 1912. Serial No. 672,056.

*To all whom it may concern:*

Be it known that I, OWEN L. BURDETT, a citizen of the United States, residing at Buffalo, in the county of Erie and State of New York, have invented new and useful Improvements in Nautical Indicating Devices, of which the following is a specification.

This invention relates to an instrument for the determination of the latitude or longitude of any given point on the earth's surface, and its object is to provide an instrument of this character which obviates the necessity of taking an observation on any heavenly body and by means of which the latitude and longitude can be determined from a direct reading of the instrument regardless of time or the state of the weather.

The invention consists of the features of construction, combination and arrangement of parts, hereinafter fully described and claimed, reference being had to the accompanying drawings, in which:—

Figure 1 is a perspective view of a nautical indicating device embodying my invention. Figs. 2 and 3 are vertical sections taken at right angles to each other through the gyroscope and related parts of the device. Fig. 4 is a vertical section through the base of the instrument. Figs. 5 and 6 are views indicating the methods of use for determining latitude and longitude.

Referring to the drawings, A is a gyroscope, comprising an electric motor, having the ends of its axis A' journaled at B and C in the horizontal metal ring D, which in turn may revolve about an axis D', supported by the standards F and G.

H is a magnet supported by the standards F and G, and holding a vertical ring or circle I graduated to $\frac{1}{3}$ degrees and read by vernier at J to $\frac{1}{2}$ minutes. The magnet H is the field magnet for the motor, of which the revolving gyroscope is the armature. The standards F and G are carried by a compass comprising a body K on which are two spirit levels L and M, the compass needle N, and the compass card or circle O graduated to $\frac{1}{2}$ degrees. The body K has a vertical axis P, slightly conical and revolving in a support R, and also a shoulder Q turning on roller bearings Q', as shown. The support R is provided with a flange R' and is carried by leveling screws U which seat in sockets V, on a metal box or base W, which rests in a mercury bed W'. The axis BC, the plane of the face of ring I upon which are placed the graduations, and the north and south points of the compass circle O are all in the same plane.

X and X' are electric feed and return wires connected at the bearing points B and C with the ends of the axis A'.

The operation of the instrument for latitude depends upon the fact that the tangent to a meridian at any point on the earth's surface makes an angle with the tangent to the same meridian at the equator equal to the latitude of the point. This is shown in Fig. 5.

Let ABCD be elevation of earth, and also the meridian through F, a point on the earth's surface. FH=rad. through F. FI=tang. through F. DB=equator or diam. in plane of meridian. ED=tang. to meridian through F at equator. Required to show that the angle EJI=latitude of point F.

Now angle FHD=latitude of point F. Draw GF through point F and parallel to ED, then angle EJI=GFI, but angle GFI=angle FHD because sides of one are perpendicular to sides of other, therefore angle EJI=angle FHD and angle EJI= latitude of point F.

The axis of the gyroscope A is always pointing in a direction perpendicular to the plane of the earth's equator, that is, parallel to the tangents at the equator to all the meridians. The direction of the tangent to the meridian at any point occupied on the earth's surface is determined when the instrument is leveled; consequently, if the ring I is graduated into four quadrants, 0° to 90°; 90° to 0°; 0° to 90° and 90° to 0°, and the instrument is so constructed that a line from 0° to 0° is a level line when the instrument is leveled, we have the direction of the tangent to the meridian at the point occupied, and the angle between that tangent and the axis of the gyroscope can be read directly on graduated ring I. This angle is the latitude of the point.

The method of use is as follows: Before leaving a port, the axis of the gyroscope A would be pointed in a direction perpendicular to the plane of the earth's equator. This is done by setting off magnetic deflection on compass circle and latitude of port on scale I with O of vernier J. (The magnetic deflection of various ports as well as their latitudes are already known). The gyroscope is then set in motion by an electric current, the current entering from the wire X, passing through the ring D to B, through motor to C, and through ring D to D' from which point it leaves the instrument through the wire X'. Now as the instrument is taken away from or nearer to the equator, the axis of the gyroscope still remains perpendicular to the plane of the equator and parallel to the tangent to any meridian at the equator, but the direction of tangents to meridians at points occupied as determined by levels is always changing and this varying angle between the two tangents is the angle measured, as has already been shown. At the equator a level line pointing north is perpendicular to the plane of earth's equator and we would read 0° on scale or 0 latitude. At the poles a level line is parallel to plane of earth's equator and we would read 90° on scale or 90° latitude. Before reading the latitude, the axis of the gyroscope should be placed as near as possible in plane of meridian, by setting off the approximate magnetic deflection.

Another instrument, a duplicate of the one described, would be used in determining the longitude of any point. At port of departure, the axis of the gyroscope would be pointed toward the east, by means of the compass; after the instrument is moved, the axis of the gyroscope A will remain perpendicular to the plane of the meridian first occupied, and the longitude of any point may be found as follows,—referring to Fig. 6. Let A be the point first occupied and ABCFG be the meridian through A. At A easterly direction is perpendicular to plane of ABCFG or perpendicular to the plane of the figure. As the instrument is moved, the axis of the gyroscope, which has been pointed perpendicular to plane of meridian ABCFG, will remain continually in this direction. Suppose then that the instrument is moved to any point D on the earth's surface and it is desired to find the longitude of point D. The angle measured by the instrument is equal to the arc CD also equal to the angle between the tangents at points C and D drawn to the great circle which passes through points E and D, E being a point 90° from B, the north pole, and 90° from the meridian which passes through A.

In spherical triangle BED side ED = 90°—arc CD (arc CD measured by inst.) Side BE=90°. Side BD=CO—latitude of D as determined by instrument used for finding the latitude. Then $$\tan. \tfrac{1}{2} \text{ angle BED} = \sqrt{\frac{\sin. (S-BE) \sin. (S-ED)}{\sin. S \sin. (S-BD)}}$$

where $S=\tfrac{1}{2}(BE+ED+BD)$.

In spherical triangle ADE side AE= 90°. Side ED=90° arc CD. Angle AED=angle BED+ang. BEA (BEA=co—lat. of A). Then $$\tan. \tfrac{1}{2}(EAD+ADE) = \frac{\cos. \tfrac{1}{2}(AE-ED) \cot. \tfrac{1}{2}AED}{\cos. \tfrac{1}{2}(AE+ED)}$$

and $$\tan. \tfrac{1}{2}(ADE-EAD) = \frac{\sin. \tfrac{1}{2}(AE-ED) \cot. \tfrac{1}{2}AED}{\sin. \tfrac{1}{2}(AE+ED)}$$

From these two formulæ, we obtain the values of angles EAD and ADE.

Substituting the value of angle EAD in following formula, we obtain value of side AD.

$$\sin. AD = \frac{\sin. DE \sin. AED}{\sin. EAD}$$

In spherical triangle ABD we know values of sides AB, BD and DA. Then $$\tan. \tfrac{1}{2} \text{ angle ABD} = \sqrt{\frac{\sin. (S-AB) \sin. (S-BD)}{\sin. S \sin. (S-AD)}}$$

where $S=\tfrac{1}{2}(AB+BD+DA)$.

We have then the angle ABD, the difference in longitude between the point A and the point D.

From the foregoing description, taken in connection with the drawings, the construction and mode of use of the indicator will be apparent and it will be seen that the invention provides an indicator whereby the latitude and longitude of any given point may be determined from a direct reading of the instrument, regardless of time or the state of the weather, and without the necessity of taking an observation from the sun or other heavenly body, the advantages of which will be appreciated.

Having thus described the invention, what I claim as new is:—

1. A nautical indicating device comprising a base, a compass mounted on the base for pivotal movement about a vertical axis and provided with levels for indicating the angularity thereof in two planes at right angles to each other, a gyroscope, a ring pivotally supported by the compass to tilt upon a horizontal axis and in which the axis of said gyroscope is journaled, a vernier carried by said ring, and a vertically supported ring provided with graduations for coöperation with the vernier, said ring and the gyroscope axis being arranged in the same vertical plane and in the plane of the north and south points of the compass circle.

2. A nautical indicating device comprising a compass, pivoted for movement about a vertical axis, a gyroscope having its axis arranged in the diametrical plane of the north and south points of the compass circle, a ring pivotally mounted upon the compass to tilt upon a horizontal axis and in which the axis of the gyroscope is journaled, and a vertical ring supported in a fixed position upon the compass and in the plane of the axis of the gyroscope, said rings being provided with coöperating angle indicating scales.

3. A nautical indicating device comprising a compass pivoted for movement about a vertical axis and provided with levels for indicating the angularity thereof in two planes at right angles to each other, an indicating ring pivotally supported by the compass to tilt upon a horizontal axis, a member journaled on said ring and adapted through the pivotal mounting of the compass and ring for adjustment to set its axis parallel with the earth's axis and operative to maintain itself in such position in the course of travel of the vessel, and a vertical indicating ring adjustable with relation to the compass and first named indicating ring in the course of travel of the vessel.

4. A nautical indicating device comprising a compass pivoted for movement about a vertical axis and provided with levels for indicating the angularity thereof in two planes at right angles to each other, an indicating ring pivotally supported by the compass to tilt upon a horizontal axis, a gyroscope member journaled on said ring and forming the armature of an electric motor, said member being adapted through the pivotal mounting of the compass and ring for adjustment to set its axis parallel with the earth's axis, and operative to maintain itself in such position in the course of travel of the vessel, a vertical indicating ring adjustable with relation to the compass and first named ring in the course of travel of the vessel, and a magnet supporting said vertical ring and constituting the field magnet of said motor.

5. A nautical indicating device comprising a fluid supported base, a compass supported by said base for pivotal movement about a vertical axis and provided with levels, an indicating ring pivotally supported by the compass to tilt upon a horizontal axis, a member journaled on said ring and adapted through the pivotal mounting of the compass and ring for adjustment to set its axis parallel with the earth's axis, and operative to maintain itself in such position in the course of travel of the vessel, and a vertical indicating ring adjustable with relation to the compass and first named indicating ring in the course of travel of the vessel.

6. A nautical indicating device comprising a fluid supported base, a compass supported by said base for pivotal movement about a vertical axis and provided with levels, an indicating ring pivotally supported by the compass to tilt upon a horizontal axis, a gyroscope member journaled on said ring and forming the armature of an electric motor, said member being adapted through the pivotal mounting of the compass and ring for adjustment to set its axis parallel with the earth's axis, and operative to maintain itself in such position in the course of travel of the vessel, a vertical indicating ring adjustable with relation to the compass and first named indicating ring in the course of travel of the vessel, and a magnet supporting said vertical ring, and constituting the field magnet of said motor.

In testimony whereof I affix my signature in presence of two witnesses.

OWEN L. BURDETT.

Witnesses:
   J. T. MOCKLER,
   HARRY E. ROSE.